(12) United States Patent
Rai et al.

(10) Patent No.: US 8,570,579 B2
(45) Date of Patent: Oct. 29, 2013

(54) METHODS AND SYSTEMS FOR DETERMINING CAPACITY ALLOCATION AND JOB SIZE THRESHOLDS FOR PRINT JOBS HAVING HEAVY-TAILED DISTRIBUTIONS

(75) Inventors: Sudhendu Rai, Fairport, NY (US); Ranjit Kumar Ettam, Pradesh (IN); Craig Charles Lambrecht, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 188 days.

(21) Appl. No.: 13/299,987

(22) Filed: Nov. 18, 2011

(65) Prior Publication Data

US 2013/0128302 A1    May 23, 2013

(51) Int. Cl.
*G06F 3/12* (2006.01)
*G06F 9/46* (2006.01)

(52) U.S. Cl.
USPC .................................... 358/1.15; 718/102

(58) Field of Classification Search
USPC ............... 358/1.1, 1.9, 1.13, 1.14, 1.15; 718/102–107; 709/203, 223, 226, 246
See application file for complete search history.

(56) References Cited

U.S. PATENT DOCUMENTS

| | | | | |
|---|---|---|---|---|
| 5,513,126 | A * | 4/1996 | Harkins et al. | 709/228 |
| 7,051,328 | B2 | 5/2006 | Rai et al. | |
| 7,065,567 | B1 | 6/2006 | Squires et al. | |
| 7,755,778 | B2 * | 7/2010 | Rai et al. | 358/1.1 |
| 8,107,106 | B2 * | 1/2012 | Rai | 358/1.15 |
| 8,144,364 | B2 * | 3/2012 | Rai | 358/1.9 |
| 8,145,517 | B2 * | 3/2012 | Rai | 705/7.12 |
| 2006/0039026 | A1* | 2/2006 | Lofthus et al. | 358/1.15 |
| 2009/0021773 | A1 | 1/2009 | Rai | |
| 2009/0021775 | A1 | 1/2009 | Rai | |
| 2009/0025000 | A1 | 1/2009 | Rai | |
| 2009/0025002 | A1 | 1/2009 | Rai | |
| 2009/0025003 | A1 | 1/2009 | Rai | |

OTHER PUBLICATIONS

Sudhendu Rai, 2009, "Fat-Tail Inputs in Manufacturing Systems", Proceedings of the 2008 Industrial Engineering Research Conference, pp. 1-6.
Rai et al., "LDP Lean Document Production-O.R.-Enhanced Productivity Improvements for the Printing Industry", Interfaces, vol. 39, No. 1, Jan.-Feb. 2009, pp. 69-90.
Harchol-Balter et al., "On Choosing a Task Assignment Policy for a Distributed Server System", 2004, Lecture notes in Computer Science, Springer Berlin/Heidelberg, ISBN 0302-9743.
John P. Nolan, "Multivariate Stable Distributions: Approximation, Estimation, Simulation and Identification", A Practical Guide to Heavy Tails, Statistical Techniques and Applications, Birkhauser, pp. 509-525.

\* cited by examiner

*Primary Examiner* — Gabriel Garcia
(74) *Attorney, Agent, or Firm* — Fox Rothschild LLP

(57) ABSTRACT

A method of identifying a cell configuration for a print shop may include determining a print job size distribution for a plurality of print jobs. The method may include identifying one or more print device requirements associated with a cell in a print shop, identifying a plurality of available print devices associated with the print shop and determining, by a computing device, a plurality of different configurations of the available print devices that satisfy the one or more print device requirements. The method may include, for each configuration, determining a print job size threshold value, and determining, by the computing device, a processing time associated with processing the plurality of print jobs by a cell having the configuration and the determined print job size threshold value. The method may include selecting, by the computing device, the cell having the configuration associated with the smallest processing time.

21 Claims, 5 Drawing Sheets

METHODS AND SYSTEMS FOR DETERMINING CAPACITY ALLOCATION AND JOB SIZE THRESHOLDS FOR PRINT JOBS HAVING HEAVY-TAILED DISTRIBUTIONS

BACKGROUND

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

Scheduling architectures that organize print jobs arriving at a document production environment and route the print jobs to autonomous cells are known in the art and are described in, for example, U.S. Pat. No. 7,051,328 to Rai et al. and U.S. Pat. No. 7,065,567 to Squires et al., the disclosures of which are incorporated by reference in their entirety. Methods for distributing jobs to a receiver on a network using devices are known in the art and are described in, for example, U.S. Pat. No. 5,513,126 to Harkins et al., the disclosure of which is incorporated by reference in its entirety.

It is common for print shops to receive print jobs having variable job sizes. Problems arise when a wide distribution of job sizes exists. This may be referred to as a heavy-tailed distribution. Typically, print jobs are routed to autonomous cells by associating a print function of each print job to print devices in autonomous cells with the objective of minimizing the maximum makespan across all autonomous cells. However, processing heavy-tailed distributions in this manner often causes delays, inefficiencies and poor print shop performance. Print shops are not configured to account for these large jobs, and these large jobs are not routed in a manner that assures the best use of print shop resources.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. Nothing in this document is to be construed as an admission that the embodiments described in this document are not entitled to antedate such disclosure by virtue of prior invention. As used herein, the term "comprising" means "including, but not limited to."

In an embodiment, a method of identifying a cell configuration for a print shop may include determining a print job size distribution for a plurality of print jobs. The print job size distribution may include a heavy-tailed distribution. Each print job may have an associated print job size. The method may include identifying one or more print device requirements associated with a cell in a print shop, identifying a plurality of available print devices associated with the print shop and determining, by a computing device, a plurality of different configurations of the available print devices that satisfy the one or more print device requirements. The method may include, for each configuration, determining a print job size threshold value, and determining, by the computing device, a processing time associated with processing the plurality of print jobs by a cell having the configuration and the determined print job size threshold value. The method may include selecting, by the computing device, the cell having the configuration associated with the smallest processing time.

In an embodiment, a system for identifying a cell configuration for a print shop may include a computing device and a computer-readable storage medium in communication with the computing device. The computer-readable storage medium may include one or more programming instructions for determining a print job size distribution for a plurality of print jobs, identifying one or more print device requirements associated with a cell in a print shop, identifying a plurality of available print devices associated with the print shop, and determining a plurality of different configurations of the available print devices that satisfy the one or more print device requirements. The print job size distribution may include a heavy-tailed distribution. Each print job may have an associated print job size. The computer-readable storage medium may include one or more programming instructions for, for each configuration, determining a print job size threshold value, and determining a processing time associated with processing the plurality of print jobs by a cell having the configuration and the determined print job size threshold value. The computer-readable storage medium may include one or more programming instructions for selecting the cell having the configuration associated with the smallest processing time.

DETAILED DESCRIPTION

Figure 1:
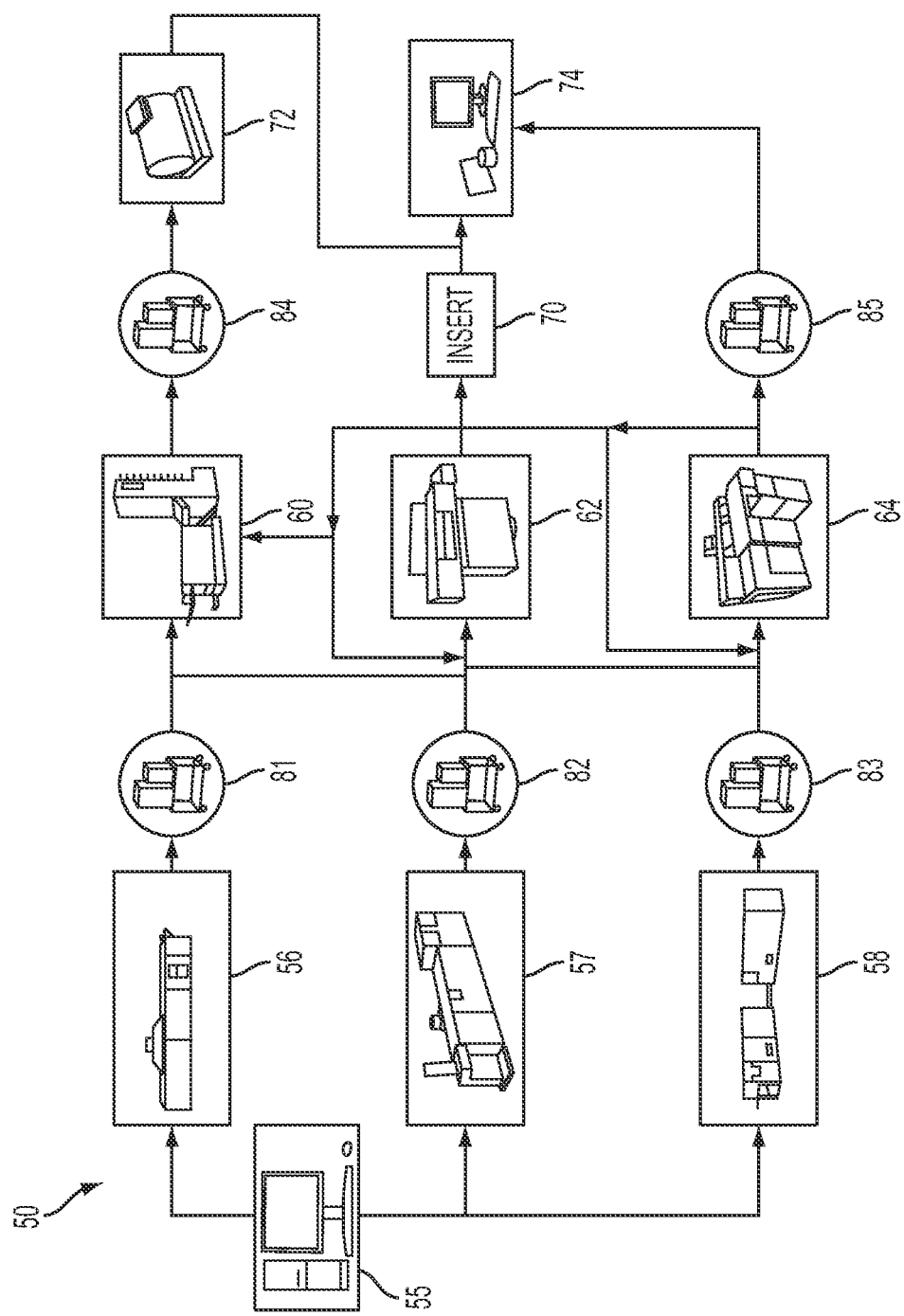
FIG. 1 illustrates an example of a production environment according to an embodiment.

The following terms shall have, for purposes of this application, the respective meanings set forth below:

A "print device" refers to a device capable of performing one or more functions, operations and/or services on a print job. For example, a print device may provide print-related services for one or more print jobs. A print device may include a printer, a cutter, a collator, a scanner, a fax machine, a multi-function device or other similar equipment.

A "job" refers to a logical unit of work that is to be completed for a customer. In a print environment, a job may include one or more print jobs from one or more clients.

A "print job" refers to a job processed in a print production system. For example, a print job may include producing credit card statements corresponding to a certain credit company, producing bank statements corresponding to a certain bank, printing a document, or the like. Although the disclosed embodiments pertain to print jobs, the disclosed methods and systems can be applied to jobs in general in other production environments, such as automotive manufacturing, semiconductor production and the like.

A "print job size" is a measurement of an amount of resource needed to process a print job. For example, a print job size may be the number of pages in a print job, an amount of ink and/or toner needed to process the print job and/or the like.

A "print shop" refers to an entity that includes a plurality of print devices, such as printers, cutters, collators and the like. A print shop may be a freestanding entity, including one or more print devices, or it may be part of a corporation or other entity. Additionally, a print shop may communicate with one or more servers by way of a communications network, such as the Internet, an intranet, a LAN, a WAN, a wireless network and/or the like.

A "print job function" is an operation, such as printing, binding, collating and/or the like, that is performed on a print job.

"Processing" of a print job means performing one or more print job functions on a print job to transform the print job in some manner and/or result in the display, transmission or conversion of the print job to a physical substrate.

"Non-processing time" refers to an amount of time between submission of a job and completion of a job that is not time spent processing the job. Non-processing time may include pre-processing time, setup time, waiting time and/or the like. For example, non-process sing time may include the amount of time needed to setup one or more print devices or the amount of time a job spends waiting due to machine unavailability and/or operator unavailability.

"Turnaround time" of a print job refers to the time difference between print job submission and completion. Turnaround time may include processing time and non-processing time.

"Average turnaround time" refers to the arithmetic mean of individual turnaround times.

A "makespan" refers to a difference between a maximum completion time associated with one or more print jobs and a minimum arrival time associated with the one or more print jobs. For example, a makespan associated with two print jobs, Print Job 1 {arrival time=8:05 a.m.; completion time=9:31 a.m.} and Print Job 2 {arrival time=8:10 a.m. and 9:24 a.m.} is 86 minutes (i.e., 9:31 a.m.-8:05 a.m.).

An "average makespan" refers to the arithmetic mean of individual makespan values.

A "processing time" is an amount of time associated with processing a job. A processing time may include setup time and/or value added time.

A "setup time" is an amount of time to prepare one or more print devices to process a particular job. For example, a setup time may include an amount of time needed to change a form type, an ink type and/or the like.

A "print device requirement" is a specification of one or more capabilities of a cell. Print device requirements may indicate one or more print job functions associated with the cell, one or more print devices, print device types, print device models and/or the like associated with the cell and/or the like.

FIG. 1 shows an example of a production environment 50, in this case, examples of elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85. Although the disclosed embodiments pertain to document production systems, the disclosed methods and systems can be applied to production systems in general.

In an embodiment, print jobs may have different processing requirements. For example, incoming print jobs may have variable job sizes, setup requirements, processing frequency and the like. An autonomous cell refers to a group of print devices used to process print jobs. An autonomous cell may include the print devices needed to complete at least one print job. For example, if the print job requires printing, cutting and collating, an autonomous cell for processing the print job may include at least one printer, one cutter and one collator.

In an embodiment, a print job size distribution may describe a probability distribution of a real-valued random variable. Examples of types of print job size distributions may include normal distributions, exponential distributions, logarithmic distributions, cumulative distributions and the like.

A group of print jobs having a large print job size distribution may be referred to as having a heavy-tailed distribution. A heavy-tailed distribution may be characterized as a print job size distribution possessing a tail that decays slowly. In other words, as the value of the random variable increases, a probability associated with the random variable decreases. Heavy-tailed distributions may have many small print jobs mixed with a few large print jobs. As such, even though the majority of the job sizes are small, a substantial contribution to the mean or variance for the print jobs considered in the distribution may come from the few large print jobs.

In an embodiment, X may be a random variable with a cumulative density function ("CDF"), $F(x)=P[X \leq x]$. The area under the CDF from 0 to X as X approaches infinity may be equal to one. A complementary CDF("CCDF") may be represented by $F_c(x)=P[X>x]$, where the CCDF=1−CDF. The CDF may be heavy-tailed if the CCDF~$cx^{-\alpha}$ where $\alpha$ is between zero and two. As such, $$\lim_{x \to \infty} \frac{d \log F_c(x)}{d \log x} = -\alpha$$

Accordingly, the decay rate of a CDF for large job sizes may be equal to $\alpha$. The decay rate of the CDF may be represented by the slope of the CDF. In an embodiment, if X is a random variable with a pareto distribution, the probability density function of X may be illustrated by:

$$f(x) = \alpha^* x_m^{\alpha} x^{-\alpha-1},$$

where $x_m$ is the minimum possible value of X, and $\alpha$ is the distribution characteristic.

In an embodiment, a size-based scheduling policy may be used to schedule print jobs to one or more print devices. In an embodiment, a Size Interval Task Assignment with Equal load ("SITA-E") policy may be used. Using the SITA-E policy, a size range may be associated with one or more print devices, and a print job may be sent to the appropriate print device based on its size such that the total load directed to each print device is the same. The size threshold values associated with this policy may be derived by the following:

$$\int_{y_0=k}^{y_1} x*d(f(x)) = \int_{y_1}^{y_2} x*d(f(x)) = \ldots \int_{y_{n-1}}^{y_n=p} x*d(f(x))$$

$$y_i = \left\{\frac{(n-i)}{n}*k^{1-\alpha} + \frac{i}{n}*p^{1-\alpha}\right\}^{\frac{1}{1-\alpha}}, \text{ if } \alpha \neq 1$$

$$y_i = k\left(\frac{p}{k}\right)^{\frac{i}{n}}, \text{ if } \alpha = 1$$

In an embodiment, a print shop may have a certain number and/or type of associated print devices. These print devices may be arranged into two cells to minimize the turnaround time and/or makespan associated with processing one or more heavy-tailed distributions by the print shop. In an embodiment, one cell may process print jobs having a print job size below a job size threshold value. In an embodiment, another cell may process print jobs having a print job size equal to or exceeding a job size threshold value.

In an embodiment, the print devices assigned to each cell in a print shop may be determined. In an embodiment, the combination of print devices that are assigned to a cell may be the combination associated with a least average turnaround time and/or makespan for the print shop.

Figure 2:
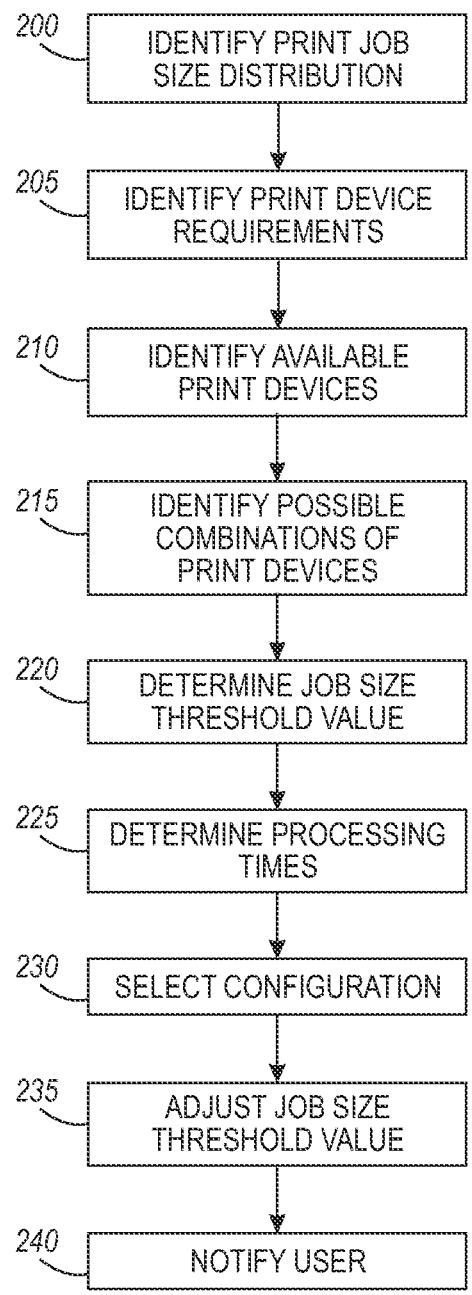
FIG. 2 illustrates an example of a method of determining one or more print devices associated with one or more cells of a print shop according to an embodiment.

FIG. 2 illustrates a method of determining one or more print devices associated with one or more cells of a print shop according to an embodiment. In an embodiment, a print job size distribution may be identified 200. A print job size distribution may be identified using historical print jobs that have been processed by a print shop. In an embodiment, a print job size distribution may be identified using estimated print jobs.

Figure 3:
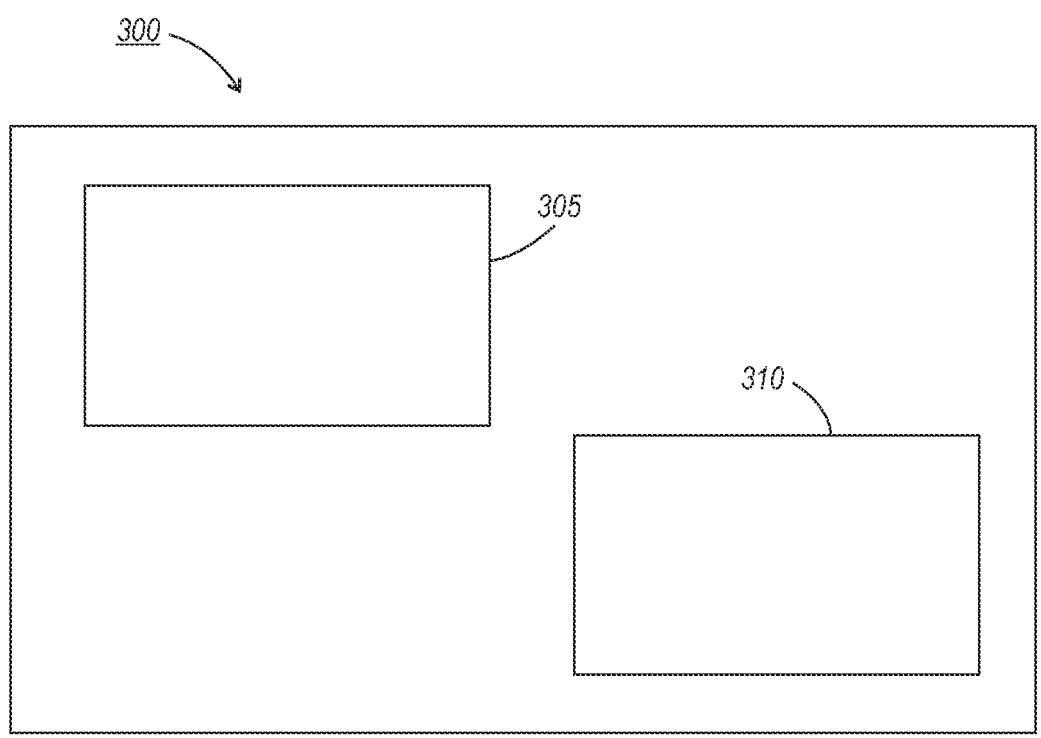
FIG. 3 illustrates an example of a print shop according to an embodiment.

In an embodiment, one or more print device requirements associated with a cell may be identified 205. For example, a print device requirement may be that the cell must have two printers and two inserters. FIG. 3 illustrates an example print shop according to an embodiment. As illustrated by FIG. 3, the print shop 300 may include, for example and without limitation, two cells, Cell 1 305 and Cell 2 310. It is understood that a different number of cells may be used within the scope of this disclosure. In an embodiment, the print device requirements associated with each cell may specify that each cell is to include, for example and without limitation, two printers and two inserters. It is understood that different numbers and types of print devices may be used within the scope of this disclosure. In an embodiment, a plurality of available print devices for inclusion in a print shop may be identified 210. For example, the possible print devices for inclusion in the print shop illustrated in FIG. 3 may be identified 210 as printers A, B, C and D and inserters 1, 2, 3 and 4.

In an embodiment, one or more possible combinations of available print devices that satisfy the print device requirements of the print shop may be identified 215. For example, Table 1 illustrates the combinations of print devices that satisfy its print device requirements according to an embodiment.

TABLE 1

| Configuration | Cell 1 | Cell 2 |
| --- | --- | --- |
| 1 | A, B, 1, 2 | C, D, 3, 4 |
| 2 | A, B, 3, 4 | C, D, 1, 2 |

TABLE 1-continued

| Configuration | Cell 1 | Cell 2 |
| --- | --- | --- |
| 3 | A, B, 2, 3 | C, D, 1, 4 |
| 4 | A, B, 2, 4 | C, D, 1, 3 |
| 5 | A, B, 1, 3 | C, D, 2, 4 |
| 6 | A, B, 1, 4 | C, D, 2, 3 |
| 7 | A, C, 1, 2 | B, D, 3, 4 |
| 8 | A, C, 3, 4 | B, D, 1, 2 |
| 9 | A, C, 2, 3 | B, D, 1, 4 |
| 10 | A, C, 2, 4 | B, D, 1, 3 |
| 11 | A, C, 1, 3 | B, D, 2, 4 |
| 12 | A, C, 1, 4 | B, D, 2, 3 |
| 13 | A, D, 1, 2 | B, C, 3, 4 |
| 14 | A, D, 3, 4 | B, C, 1, 2 |
| 15 | A, D, 2, 3 | B, C, 1, 4 |
| 16 | A, D, 2, 4 | B, C, 1, 3 |
| 17 | A, D, 1, 3 | B, C, 2, 4 |
| 18 | A, D, 1, 4 | B, C, 2, 3 |
| 19 | C, D, 1, 2 | A, B, 3, 4 |
| 20 | C, D, 3, 4 | A, B, 1, 2 |
| 21 | C, D, 2, 3 | A, B, 1, 4 |
| 22 | C, D, 2, 4 | A, B, 1, 3 |
| 23 | C, D, 1, 3 | A, B, 2, 4 |
| 24 | C, D, 1, 4 | A, B, 2, 3 |
| 25 | B, D, 1, 2 | A, C, 3, 4, |
| 26 | B, D, 3, 4 | A, C, 1, 2 |
| 27 | B, D, 2, 3 | A, C, 1, 4 |
| 28 | B, D, 2, 4 | A, C, 1, 3 |
| 29 | B, D, 1, 3 | A, C, 2, 4 |
| 30 | B, D, 1, 4 | A, C, 2, 3 |
| 31 | C, B, 1, 2 | A, D, 3, 4 |
| 32 | C, B, 3, 4 | A, D, 1, 2 |
| 33 | C, B, 2, 3 | A, D, 1, 4 |
| 34 | C, B, 2, 4 | A, D, 1, 3 |
| 35 | C, B, 1, 3 | A, D, 2, 4 |
| 36 | C, B, 1, 4 | A, D, 2, 3 |

Table 2 illustrates processing rates associated with each print device in the print shop according to an embodiment. In an embodiment, a processing rate may be the number of documents a print device can process over a period of time. For example, as illustrated by Table 2, a processing rate may be the number of documents that a print device can process per hour.

TABLE 2

| Print Device | Processing Rate |
| --- | --- |
| Printer A | 9,000 pages/hour |
| Printer B | 4,500 pages/hour |
| Printer C | 12,000 pages/hour |
| Printer D | 7,500 pages/hour |
| Inserter 1 | 1,500 pages/hour |
| Inserter 2 | 3,000 pages/hour |
| Inserter 3 | 5,000 pages/hour |
| Inserter 4 | 7,000 pages/hour |

In an embodiment, a job size threshold value may be determined 220 for one or more cell configurations. In an embodiment, a job size threshold value may be determined 220 for a cell configuration based on a cell capacity ratio associated with the print shop. In an embodiment, a cell capacity ratio may be a ratio of the sum of the print device speeds in a cell to the sum of the print device speeds in all of the cells in the print shop. In an embodiment, a total volume of a job size distribution may be divided into one or more size ranges. In an embodiment, a total volume of a job size distribution may be divided into one or more size ranges such that the ratio of the aggregate job volume of print job distribution/quantity of print jobs processed by a cell to the aggregate job volume of print job distribution/quantity of all print jobs processed by the print shop is proportional to a cell capacity ratio. In an embodiment, this may be represented by the following:

$$\frac{\sum_{i=1}^{n_j} x_i}{\sum_{i=1}^{n} x_i} \propto \frac{C_j}{C},$$

where j=1, ... h and where:

i=print job index, j=cell index, $x_i$=print job size, h=number of cells in a print shop, Cj=sum of the speeds of all of the print devices in cell j, C=sum of the speeds of all of the print devices in all of the cells, $n_j$=number of print jobs in cell j, n=total number of print jobs in all cells, $$\frac{C_j}{C} = \text{cell capacity ratio.}$$

In an embodiment, the number of threshold values may be equal to one less than the number of cells in a print shop (i.e., h−1). In an embodiment, threshold values may be between k and p, where k is the minimum value of the job size distribution and p is the maximum value of the job size distribution. In an embodiment, one or more thresholds may be determined by a trial and error method.

In an embodiment, a cell capacity ratio for Cell 1 having Configuration 1 (as illustrated by Table 1) may be determined by:

$$\frac{C_1}{C} = \frac{\text{sum of processing rates of } A, B, 1, 2}{\text{sum of processing rates of } A, B, C, D, 1, 2, 3, 4}$$

As such, the cell capacity ratio associated with Cell 1 having Configuration 1 may be:

$$\frac{C_1}{C} = \frac{9000 + 4500 + 1500 + 3000}{9000 + 4500 + 12000 + 7500 + 1500 + 3000 + 5000 + 7000} = 0.3636$$

In an embodiment, a job size threshold value for a heavy-tailed distribution processed by the print devices of a cell may be determined. For example, a job size threshold value for a heavy-tailed distribution processed by the print devices of Cell 1 having Configuration 1 may be determined. In an embodiment, the print jobs in a print job distribution may be arranged in descending order according to print job size.

In an embodiment, the number of print jobs assigned to a cell may be varied until the ratio of $$\frac{\sum_{i=1}^{n_j} x_i}{\sum_{i=1}^{n} x_i}$$

equals the cell capacity ratio. For example, the number of print jobs assigned to Cell 1 in configuration 1 from FIG. 3 may be varied until the ratio of $$\frac{\sum_{i=1}^{n_j} x_i}{\sum_{i=1}^{n} x_i}$$

equals 0.3636. In an embodiment, the number of print jobs assigned to a cell may be that which yields a ratio of $$\frac{\sum_{i=1}^{n_j} x_i}{\sum_{i=1}^{n} x_i}$$

that is the closest to the cell capacity ratio. In an embodiment, the number of print jobs assigned to a cell may be that which yields a ratio of $$\frac{\sum_{i=1}^{n_j} x_i}{\sum_{i=1}^{n} x_i}$$

that is the closest to the cell capacity ratio without exceeding the cell capacity ratio.

In an embodiment, the job size of the print job corresponding to a position equal to $n_j+1$ in the ordered list (in descending order) of print jobs may be designed as the job size threshold value for the cell. For example, if Cell 1 having Configuration 1 Table 1 yields a ratio of $$\frac{\sum_{i=1}^{n_j} x_i}{\sum_{i=1}^{n} x_i}$$

equal to 0.3636, and the job size listed at position $n_j+1$ of the ordered list of print jobs is 163,792 pages, then the job size threshold value may be 163,792 pages. As such, print jobs having a print job size that is greater than 163,792 pages may be assigned to Cell 1 having Configuration 1 in Table 1, while print jobs having a print job size that is less than or equal to 163,792 pages may be assigned to Cell 2 having Configuration 1 in Table 1.

In an embodiment, a processing time associated with processing print jobs by a cell having one or more configurations may be determined 225. In an embodiment, a processing time associated with processing print jobs by each cell configuration may be determined. In an embodiment, an average turnaround time associated with processing print jobs by one or more cell configurations may be determined.

In an embodiment an average turnaround time associated with processing one or more print jobs may be determined. In an embodiment, an average turnaround time may be determined by summing the individual turnaround times associated with each print job, and dividing the sum by the total number of print jobs. In an embodiment, the cell to which each print job is assigned may be determined based on the determined job size threshold value associated with the cell configuration. In an embodiment, a print job size associated with a print job may be compared to a job size threshold value associated with a cell configuration. If the print job size is less than or equal to the job size threshold value, the print job may be assigned to one cell. If the print jobs size is greater than the job size threshold value, the print job may be assigned to another cell.

For example, as discussed above, print jobs having a print job size that is greater than 163,792 pages may be assigned to Cell 1 having Configuration 1 in Table 1, while print jobs having a print job size that is less than or equal to 163,792 pages may be assigned to Cell 2 having Configuration 1 in Table 1.

In an embodiment, a turnaround time may be determined by summing the processing time associated with processing the print job by one or more print devices in the assigned cell and the non-processing time associated with the job. In an embodiment, a processing time associated with a print device may be determined by dividing the job size associated with the print job by the processing rate associated with the print device that is processing the print job and adding one or more setup times associated with the print device.

In an embodiment, the turnaround time for processing a print job by a configuration may be determined by summing the processing time associated with processing the print job by one or more print devices in the configuration and the non-processing time associated with the print job. In an embodiment, an average turnaround time for processing one or more print jobs by a configuration may be determined by dividing the individual turnaround time the print job by the total number of print jobs.

In an embodiment, a makespan value associated with processing one or more print jobs by a configuration may be determined. In an embodiment, a makespan value may be determined by determining the difference between a maximum completion time associated with one or more print jobs and a minimum arrival time associated with the one or more print jobs.

Table 3 illustrates examples of job size threshold values, average turnaround times and makespan values for a sample of the cell configurations identified in Table 1 according to an embodiment.

TABLE 9

| Configuration | Cell 1 Configuration | Cell 2 Configuration | Cell Capacity Ratio | Job Size Threshold Value | Average Turnaround Time - considering job size (hours) | Average Turnaround Time - not considering job size (hours) | Makespan Value - considering job size (hours) | Makespan Value - not considering job size (hours) |
|---|---|---|---|---|---|---|---|---|
| 1 | A, B, 1, 2 | C, D, 3, 4 | 0.3636 | 163,792 | 90.8 | 294 | 1562 | 1559 |
| 2 | A, B, 3, 4 | C, D, 1, 2 | 0.5151 | 105,524 | 262 | 313 | 1215 | 1642 |
| 3 | A, B, 2, 3 | C, D, 1, 4 | 0.4343 | 126,587 | 107 | 168 | 1046 | 1141 |
| 4 | A, B, 2, 4 | C, D, 1, 3 | 0.4747 | 117,896 | 133 | 205 | 1043 | 1167 |
| 5 | A, B, 1, 3 | C, D, 2, 4 | 0.4040 | 141,575 | 80.73 | 186 | 1206 | 1255 |
| 6 | A, B, 1, 4 | C, D, 2, 3 | 0.4444 | 124,534 | 113 | 177 | 1107 | 1150 |
| 7 | A, C, 1, 2 | B, D, 3, 4 | 0.5151 | 105,524 | 192 | 333 | 1886 | 1565 |
| 8 | A, B, 1, 2 | C, D, 3, 4 | 0.6666 | 82,078 | 120 | 291 | 918 | 1724 |
| 9 | A, B, 3, 4 | C, D, 1, 2 | 0.5858 | 89,050 | 138 | 214 | 1189 | 1268 |

In an embodiment, the configuration having the job size threshold value that minimizes the processing time may be selected 230. For example, the configuration having the job size threshold value that minimizes the average turnaround time may be selected 230. For instance, referring to Table 3, to minimize the average turnaround time, Configuration 5 having a Cell 1 configuration of (A, B, 1, 3) may be selected 230, and this configuration may be associated with a job size threshold value of 141,575 pages. As such, Cell 1 may process print jobs having a job size that is greater than 141,575 pages, while Cell 2 may process print jobs having a job size that is equal to or less than 141,575 pages.

In an embodiment, to minimize makespan, Configuration 8 having a Cell 1 configuration of (A, C, 3, 4) may be selected, and this configuration may be associated with a job size threshold value of 82,078 pages. As such, Cell 1 may process print jobs having a job size that is greater than 82,078 pages, while Cell 2 may process print jobs having a job size that is equal to or less than 82,078 pages.

In an embodiment, print devices assigned to each cell in a print shop may be determined based on a bottleneck function. A bottleneck function may be a print function that paces the overall production of a print job. For instance, a bottleneck function may be a print function that takes the longest amount of time to complete. For example, in an embodiment, inserting may take longer than printing, so inserting may be a bottleneck activity for print jobs associated with printing and inserting print functions.

In an embodiment, one or more print devices may be identified as a bottleneck print device. In an embodiment, a print function that takes the longest amount of time to complete may be identified as a bottleneck function. In an embodiment, a print device that performs the bottleneck function may be identified as a bottleneck print device.

In an embodiment, a job size threshold value may be determined 220 for one or more cell configurations. In an embodiment, a job size threshold value may be determined 220 for a cell configuration based on a cell bottleneck capacity ratio associated with the print shop. In an embodiment, a cell bottleneck capacity ratio may be a ratio of the sum of the print device speeds of the bottleneck print devices in a cell to the sum of the print device speeds of all of the bottleneck print devices in all cells in the print shop. In an embodiment, a total volume of a job size distribution may be divided into one or more size ranges. In an embodiment, a total volume of a job size distribution may be divided into one or more size ranges such that the ratio of the aggregate job volume of print job distribution/quantity of print jobs processed by a cell to the aggregate job volume of print job distribution/quantity of all print jobs processed by the print shop is proportional to a cell bottleneck capacity ratio. In an embodiment, this may be represented by the following:

$$\frac{\sum_{i=1}^{n_j} x_i}{\sum_{i=1}^{n} x_i} \propto \frac{C_j}{C},$$

where
j=1, ..., h and
where:
i=print job index,
j=cell index,
$x_i$=print job size,
h=number of cells in a print shop,
Cj=sum of the speeds of bottleneck print devices in cell j,
C=sum of the speeds of all bottleneck print devices in all of the cells,
$n_j$=number of print jobs in cell j,
n=total number of print jobs, $$\frac{C_j}{C} = \text{cell bottleneck capacity ratio.}$$

In an embodiment, the number of threshold values may be equal to one less than the number of cells in a print shop (i.e., h−1). In an embodiment, threshold values may be between k and p, where k is the minimum value of the job size distribution and p is the maximum value of the job size distribution. In an embodiment, one or more thresholds may be determined by a trial and error method.

For example, a job size threshold value for a heavy-tailed distribution processed by Cell 1 in Configuration 1 as illustrated by Table 1 may be determined as follows. In an embodiment, inserters 1 and 2 may be identified as bottleneck print devices. A cell bottleneck capacity ratio associated with Cell 1 in Configuration 1 as illustrated by Table 1 may be determined by the following:

In an embodiment, one or more bottleneck print devices may be identified. For example, inserters 1, 2, 3, and 4 from Table 1 may be identified as bottleneck print devices. In an embodiment, a cell bottleneck capacity ratio associated with a cell having a configuration may be determined by the following:

$$\frac{C_1}{C} = \frac{\text{sum of processing rates of all bottleneck print devices in configuration}}{\text{sum of processing rates of all bottleneck print devices}}$$

For example, a cell bottleneck capacity ratio associated with Cell 1 having Configuration 7 as illustrated in Table 1 may be determined by:

$$\frac{C_1}{C} = \frac{\text{sum of processing rates of Inserter 1 and Inserter 2}}{\text{sum of processing rates of Inserter 1,}}$$
$$\text{Inserter 2, Inserter 3 and Inserter 4}$$

$$\frac{C_1}{C} = \frac{1500 + 3000}{1500 + 3000 + 5000 + 7000} = 0.2727$$

In an embodiment, the print jobs in a print job distribution may be arranged in descending order according to their corresponding print job size.

In an embodiment, the number of print jobs assigned to a cell may be varied until the ratio of $$\frac{\sum_{i=1}^{n_j} x_i}{\sum_{i=1}^{n} x_i}$$

equals the cell bottleneck capacity ratio. For example, the number of print jobs assigned to Cell 1 having Configuration 7 from FIG. 1 may be varied until the ratio of $$\frac{\sum_{i=1}^{n_j} x_i}{\sum_{i=1}^{n} x_i}$$

equals 0.2727. In an embodiment, the number of print jobs assigned to a cell may be that which yields a ratio of $$\frac{\sum_{i=1}^{n_j} x_i}{\sum_{i=1}^{n} x_i}$$

that is the closest to the cell capacity ratio. In an embodiment, the number of print jobs assigned to a cell may be that which yields a ratio of $$\frac{\sum_{i=1}^{n_j} x_i}{\sum_{i=1}^{n} x_i}$$

that is the closest to the cell capacity ratio without exceeding the cell capacity ratio.

In an embodiment, the job size of the print job corresponding to a position equal to $n_j$+1 in the ordered list (in descending order) of print jobs may be designed as the job size threshold value for the cell. For example, if assigning print jobs to Cell 1 having Configuration 7 from Table 1 yields a ratio of $$\frac{\sum_{i=1}^{n_j} x_i}{\sum_{i=1}^{n} x_i}$$

equal to 0.2727, then the job size threshold value may be the job size of the $n_j+1$ in the ordered list. For example, the $n_j+1$ print job in the list may have a job size of 210,898 pages. As such, print jobs having a print job size that is greater than 210,898 pages may be assigned to Cell 1 having Configuration 7, while print jobs having a print job size that is equal to or less than 210,898 pages may be assigned to Cell 2 having Configuration 7.

Table 10 illustrates examples of job size threshold values, average turnaround times and makespan values for a sample of cell configurations identified in Table 1 when print job size is considered as compared to when print job size is not considered.

Figure 4:
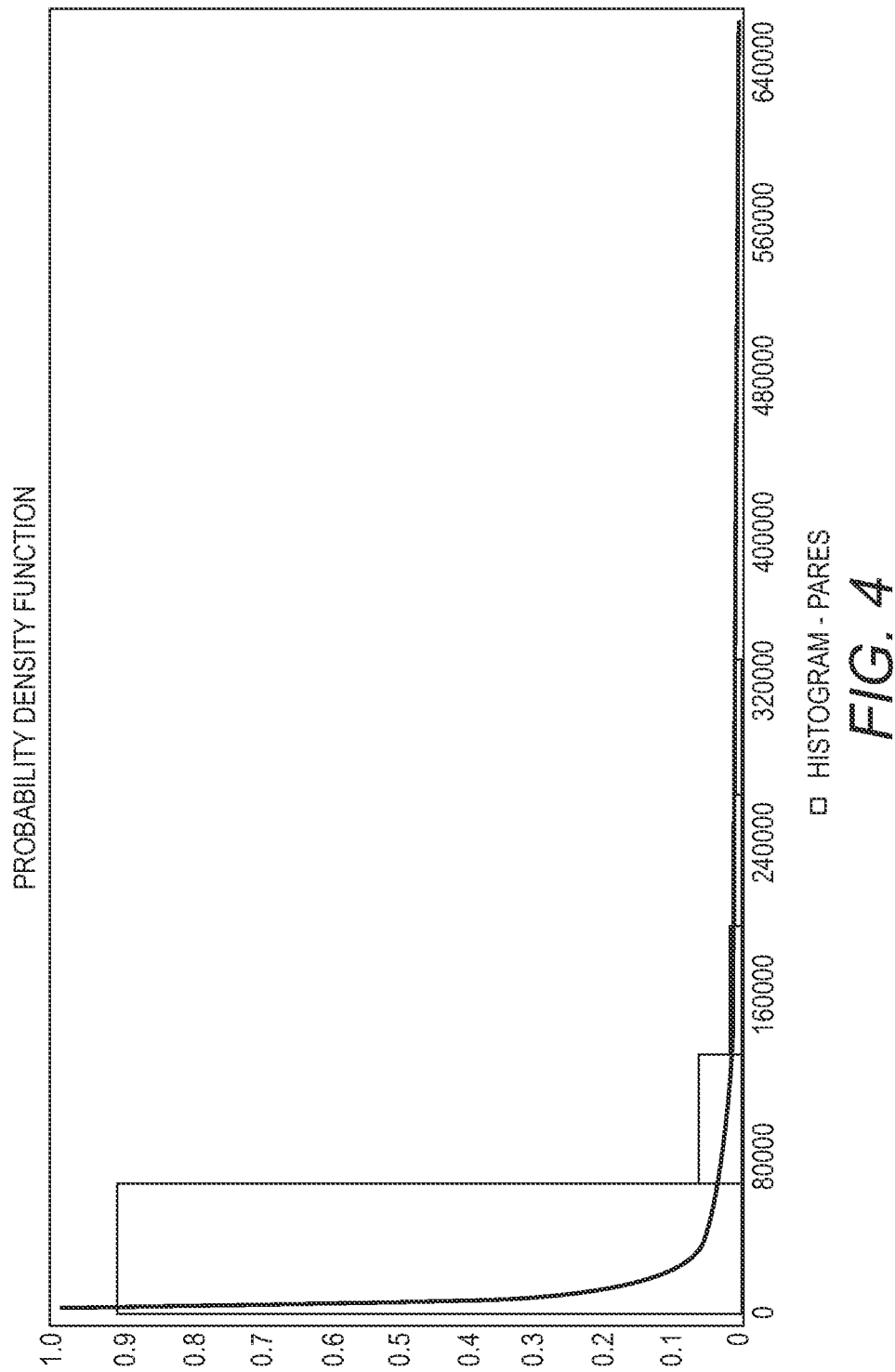
FIG. 4 illustrates an example of a heavy-tailed job size distribution according to an embodiment.

In an embodiment, a print job size distribution may follow a pareto distribution. For example, a print job size distribution may have a pareto distribution that has a probability density function of $$f(x) = \alpha * x_m{}^\alpha x^{-\alpha-1},$$

where $x_n$ is the minimum possible value of x, and $\alpha$ is the distribution characteristic. FIG. 4 illustrates an example of job size distribution having a probability distribution where $x_m=1$ and $\alpha=0.4$ according to an embodiment.

In an embodiment, print devices assigned to each cell in a print shop may be determined for print job size distributions having a pareto distribution based on a bottleneck function. In an embodiment, job volume directed to each cell in a print shop may be proportional to a cell bottleneck capacity ratio. In an embodiment, this may represented by:

$$\frac{\int_k^{y_j} x f(x)}{\int_k^p x f(x)} \alpha \frac{C_j}{C},$$

TABLE 10

| Config. | Cell 1 | Cell 2 | Cell Bottleneck Capacity Ratio | Job Size Threshold Value | Average TAT in Hours considering job size | Average TAT in Hours - not considering job size | Makespan Value in Hours - considering the job size | Makespan Value in Hours - not considering job size |
|---|---|---|---|---|---|---|---|---|
| 7 | A, C, 1, 2 | B, D, 3, 4 | 0.2727 | 210898 | 414 | 333 | 1426 | 1565 |
| 8 | A, C, 3, 4 | B, D, 1, 2 | 0.7272 | 76982 | 62.84 | 291 | 940 | 1724 |
| 9 | A, C, 2, 3 | B, D, 1, 4 | 0.4848 | 113546 | 196 | 214 | 1092 | 1268 |
| 10 | A, C, 2, 4 | B, D, 1, 3 | 0.6060 | 88120 | 119 | 192 | 1013 | 1302 |
| 11 | A, C, 1, 3 | B, D, 2, 4 | 0.3939 | 158338 | 314 | 241 | 1229 | 1297 |
| 12 | A, C, 1, 4 | B, D, 3, 2 | 0.5151 | 105524 | 177 | 193 | 1023 | 1130 |
| 13 | A, D, 1, 2 | C, B, 3, 4 | 0.2727 | 210898 | 221 | 322 | 1350 | 1622 |
| 18 | A, D, 1, 4 | C, B, 3, 2 | 0.5151 | 105524 | 83 | 165 | 1060 | 1030 |
| 20 | C, D, 3, 4 | A, B, 1, 2 | 0.7272 | 76982 | 61 | 253 | 945 | 1478 |
| 19 | C, D, 1, 2 | A, B, 3, 4 | 0.2727 | 210898 | 336 | 297 | 1276 | 1497 |

In an embodiment, a processing time associated with processing print jobs by a cell having one or more configurations may be determined 225. In an embodiment, a turnaround time, an average turnaround time and/or a makespan value may be determined. In an embodiment, the configuration having the job size threshold value that minimizes the processing time may be selected 230. For example, the configuration having the job size threshold value that minimizes the average turnaround time and/or makespan value may be selected 230. For instance, referring to Table 10, to minimize the turnaround time, Configuration 20 having a Cell 1 configuration of (C, D, 3, 4) may be selected 230. This configuration may be associated with a job size threshold value of 76,982 pages. As such, Cell 1 may process print jobs having a job size that is greater than 76,982 pages, while Cell 2 may process print jobs having a job size that is equal to or less than 76,982 pages.

As another example, to minimize makespan, Configuration 8 having a Cell 1 configuration of (A, C, 3, 4) in Table 10 may be selected 230. This configuration may be associated with a print job size threshold value of 76,982 pages. As such, Cell 1 may process print jobs having a print job size that is greater than 76,982 pages, while Cell 2 may process print jobs having a print job size that is equal to or less than 76,982 pages.

where
  j=cell index,
  Cj=sum of the processing rates of bottleneck print devices in cell j
  C=sum of processing rates of bottleneck print devices in all cells
  k=minimum value of x,
  p=maximum value of x,
  x=job size,
  $y_j$=job size threshold value of cell j, $$\frac{C_j}{C} = \text{cell bottleneck capacity ratio.}$$

In an embodiment, one or more bottleneck print devices in a print shop may be identified. In an embodiment, a job size threshold value for a cell may be determined 220. For example, if $\alpha=0.4$, k=1 and p=661,748 and using the processing speeds illustrated in Table 2, a job size threshold value for Cell 1 of Configuration 1 in Table 1 may be determined 220 by the following:

$$\frac{\int_k^y x*f(x)}{C_2} = \frac{\int_y^p x*f(x)}{C_1}$$

$$\frac{\int_k^y x*\alpha*x_m^\alpha*x^{-\alpha-1}}{C_2} = \frac{\int_y^p x*\alpha*x_m^\alpha*x^{-\alpha-1}}{C_1}$$

$$y = \left\{\frac{C_1*k^{1-\alpha} + C_2*p^{1-\alpha}}{C}\right\}^{\frac{1}{1-\alpha}},$$

where $C = C_1 + C_2$,
where C1 = sum of processing rates of Inserter 1 and Inserter 2 = 1,500 + 3,000 = 4,500
where C2 = sum of processing rates of Inserter 3 and Inserter 4 = 5,000 + 7,000 = 12,000

$$C = 4,500 + 12,000 = 16,500$$

$$y = \left\{\frac{(4500*5000^{1-0.4}) + (12,000*661,748^{1-0.4})}{16500}\right\}^{\frac{1}{1-0.4}}$$

$$y = 389,292$$

As such, print jobs having a print job size that is less than or equal to 389,292 pages may be assigned to Cell 2 in configuration 7, while print jobs having a print job size that is greater than 389,292 pages may be assigned to Cell 1 in configuration 7.

Table 11 illustrates examples of job size threshold values, average turnaround times and makespan values for a sample of cell configurations identified in Table 11 when print job size is considered as compared to when print job size is not considered.

TABLE 11

| Config | Cell 1 | Cell 2 | Job Size Threshold Value | Average TAT in Hours considering the job size | Average TAT in Hours not considering job size | Makespan Value in Hours considering job size | Makespan Value in Hours not considering job size |
| --- | --- | --- | --- | --- | --- | --- | --- |
| 7  | A, C, 1, 2 | B, D, 3, 4 | 389292 | 636   | 333 | 1876 | 1565 |
| 8  | A, C, 3, 4 | B, D, 1, 2 | 76008  | 60.58 | 291 | 944  | 1724 |
| 9  | A, C, 2, 3 | B, D, 1, 4 | 219181 | 459   | 214 | 1547 | 1268 |
| 10 | A, C, 2, 4 | B, D, 1, 3 | 140206 | 284   | 192 | 1207 | 1302 |
| 11 | A, C, 1, 3 | B, D, 2, 4 | 287323 | 509   | 241 | 1694 | 1297 |
| 12 | A, C, 1, 4 | B, D, 3, 2 | 198130 | 404   | 193 | 1427 | 1130 |
| 13 | A, D, 1, 2 | C, B, 3, 4 | 389292 | 384   | 322 | 1356 | 1622 |
| 18 | A, D, 1, 4 | C, B, 3, 2 | 198130 | 254   | 165 | 1113 | 1030 |
| 20 | C, D, 3, 4 | A, B, 1, 2 | 76008  | 57.3  | 253 | 1017 | 1478 |
| 19 | C, D, 1, 2 | A, B, 3, 4 | 389298 | 533   | 297 | 1692 | 1497 |

In an embodiment, a processing time associated with processing one or more print jobs by one or more cell configurations may be determined 225, and the configuration having the job size threshold value that minimizes the processing time may be selected 230. For example, the configuration having the job size threshold value that minimizes the average turnaround time and/or the makespan may be selected 230.

For example, referring to Table 11, to minimize turnaround time, Configuration 20 having a Cell 1 configuration of (C, D, 3, 4) may be selected 230. This configuration may be associated with a job size threshold value of 76,008 pages. As such, Cell 1 may process print jobs having a print job size that is greater than 76,008 pages, while Cell 2 may process print jobs having a print job size that is equal to or less than 76,008 pages.

As another example, to minimize makespan, Configuration 8 having a Cell 1 configuration of (A, C, 3, 4) may be selected 230. This configuration may be associated with a print job size threshold values of 76,008 pages. As such, Cell 1 may process print jobs having a print job size that greater than 76,008 pages, while Cell 2 may process print jobs having a print job size that is equal to or less than 76,008 pages.

In an embodiment, the job size threshold value associated with a selected print shop configuration may be adjusted 235. For example, a plurality of print jobs to be processed by a print shop may be identified. For instance, a plurality of print jobs to be processed a next day, a next week, a next month and/or the like by the print shop may be identified. In an embodiment, the identified plurality of print jobs may have an associated print job size distribution, and an updated job size threshold value may be determined for the print job size distribution. In an embodiment, the job size threshold value may be adjusted to reflect the updated job size threshold value. The plurality of print jobs may be processed by the print shop using the updated job size threshold value.

In an embodiment, one or more users may be notified 240 of the selected cell, the configuration associated with the cell, a job size threshold value associated with the selected cell and/or the like. In an embodiment, this information may be emailed to a user. Alternatively, this information may be displayed to a user on a display device, such as a computer monitor. The information may be presented as text, one or more charts, graphs, lists and/or the like.

Figure 5:
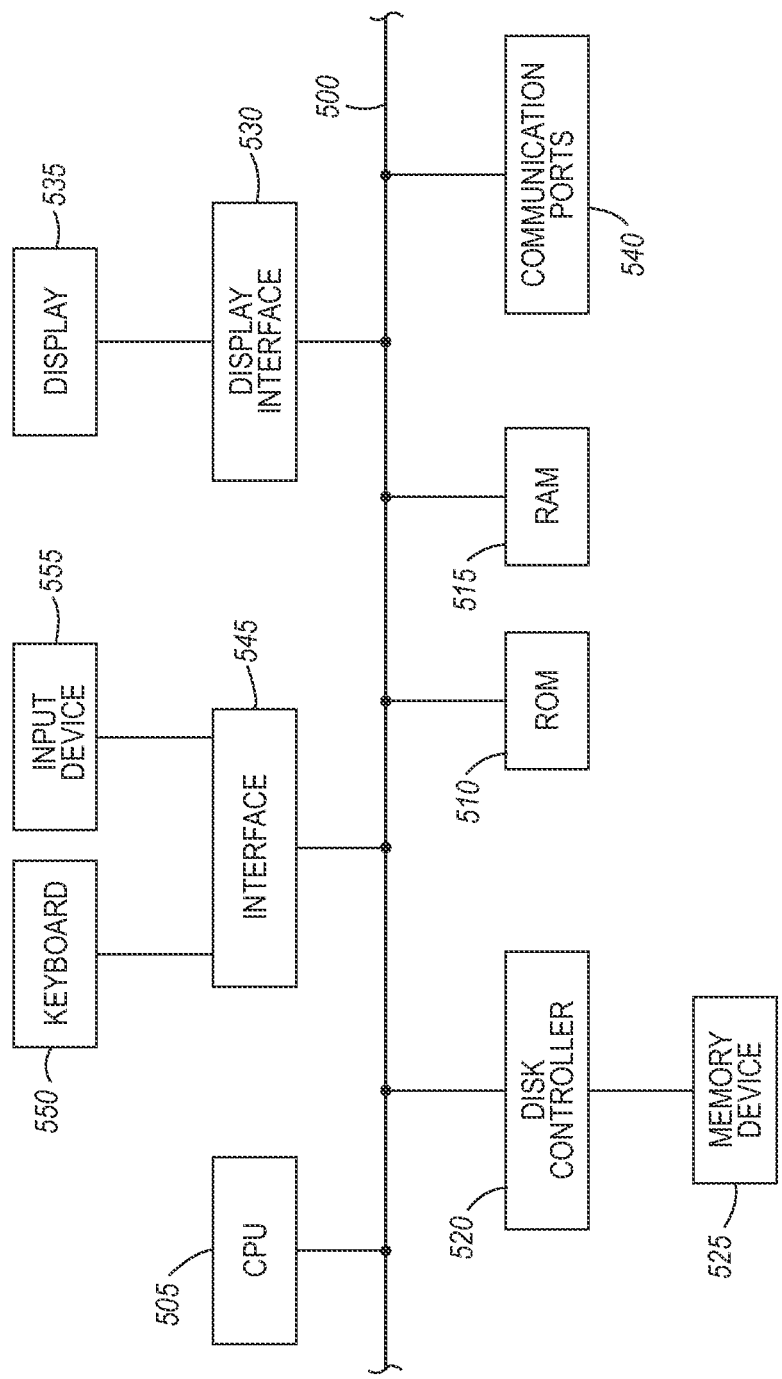
FIG. 5 depicts a block diagram of an example of an internal hardware that may be used to contain or implement program instructions according to an embodiment.

FIG. 5 depicts a block diagram of internal hardware that may be used to contain or implement program instructions according to an embodiment. A bus 500 serves as the main information highway interconnecting the other illustrated components of the hardware. CPU 505 is the central processing unit of the system, performing calculations and logic operations required to execute a program. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal DVD drive, a CD ROM drive, a hard drive, flash memory, a USB drive or the like. As indicated previously, these various drives and controllers are optional devices.

Program instructions may be stored in the ROM 510 and/or the RAM 515. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 530 may permit information from the bus 500 to be displayed on the display 535 in audio, visual, graphic or alphanumeric format. Communication with external devices may occur using various communication ports 540. Communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of identifying a cell configuration for a print shop, the method comprising:
    determining a print job size distribution for a plurality of print jobs, wherein the print job size distribution comprises a heavy-tailed distribution, wherein each print job has an associated print job size;
    identifying one or more print device requirements associated with a cell in a print shop;
    identifying a plurality of available print devices associated with the print shop;
    determining, by a computing device, a plurality of different configurations of the available print devices that satisfy the one or more print device requirements;
    for each configuration:
        determining a print job size threshold value, and
        determining, by the computing device, a processing time associated with processing the plurality of print jobs by a cell having the configuration and the determined print job size threshold value; and
    selecting, by the computing device, the cell having the configuration associated with the smallest processing time.

2. The method of claim 1, wherein determining a print job size threshold value comprises:
    determining a total print job size by summing the print job sizes associated with each print job in the plurality of print jobs; and
    identifying a subset of print jobs from the plurality of print jobs such that a ratio of a subset print job size to the total print job size equals a cell capacity ratio associated with the configuration,
    wherein the subset print job size comprises a sum of the print job sizes associated with the print jobs in the subset,
    wherein the cell capacity ratio comprises a ratio of a sum of processing speeds of each print device in the cell to a sum of processing speeds of each print device in the print shop.

3. The method of claim 2, further comprising:
    generating an ordered list comprising the plurality of print jobs arranged in descending order by corresponding print job size;
    identifying a number of print jobs in the identified subset of print jobs;
    determining an index value by incrementing the identified number of print jobs; and
    identifying the print job size associated with the print job at a position in the ordered list equal to the index value.

4. The method of claim 2, further comprising:
    determining a cell capacity ratio by determining a ratio of a sum of processing rates associated with the print devices in the configuration to a sum of processing rates associated with the plurality of available print devices.

5. The method of claim 2, further comprising:
    identifying a plurality of bottleneck print devices from the plurality of print devices, wherein each identified bottleneck print device performs a bottleneck function; and
    determining a cell capacity ratio by determining a ratio of a sum of processing rates associated with each bottleneck print device in the configuration to a sum of processing rates associated with the identified plurality of bottleneck print devices.

6. The method of claim 1, wherein the job size distribution comprises a pareto distribution having a probability density function.

7. The method of claim 6, wherein determining a job size threshold value comprises:
    identifying a plurality of bottleneck print devices from the plurality of print devices, wherein each identified bottleneck print device performs a bottleneck function;
    determining a cell capacity ratio by determining a ratio of a sum of processing rates associated with each bottleneck print device in the configuration to a sum of processing rates associated with the identified plurality of bottleneck print devices; and
    determining a job size threshold value that is proportional to the cell capacity ratio.

8. The method of claim 1, wherein determining a processing time comprises determining a turnaround time associated with processing the plurality of print jobs by a cell having the configuration and the determined job size threshold value.

9. The method of claim 1, wherein determining a processing time comprises determining a makespan value associated with processing the plurality of print jobs by a cell having the configuration and the determined job size threshold value.

10. The method of claim 1, further comprising:
    in response to a print job from the plurality of print jobs having a print job size that is greater than the threshold value associated with the selected cell, processing the print job by the selected cell; and
    in response to the print job having a print job size that is not greater than the threshold value associated with the selected cell, processing the print job by another cell.

11. The method of claim 1, further comprising:
    identifying a second plurality of print jobs, wherein the second plurality of print jobs are to be processed by the print shop at a future time;
    identifying a second print job size distribution associated with the second plurality of print jobs;
    determining an updated print job size threshold value associated with processing the second plurality of print jobs by the selected cell; and
    processing, by the selected cell, one or more print jobs from the second plurality of print jobs, wherein each of the one or more print jobs has a print job size that is less than the associated print job size threshold value.

12. A system for identifying a cell configuration for a print shop, the system comprising:
- a computing device; and
- a computer-readable storage medium in communication with the computing device, wherein the computer-readable storage medium comprises one or more programming instructions for:
  - determining a print job size distribution for a plurality of print jobs, wherein the print job size distribution comprises a heavy-tailed distribution, wherein each print job has an associated print job size,
  - identifying one or more print device requirements associated with a cell in a print shop,
  - identifying a plurality of available print devices associated with the print shop; determining a plurality of different configurations of the available print devices that satisfy the one or more print device requirements,
  - for each configuration:
    - determining a print job size threshold value, and
    - determining a processing time associated with processing the plurality of print jobs by a cell having the configuration and the determined print job size threshold value, and
  - selecting the cell having the configuration associated with the smallest processing time.

13. The system of claim 12, wherein the one or more programming instructions for determining a print job size threshold value comprise one or more programming instructions for:
- determining a total print job size by summing the print job sizes associated with each print job in the plurality of print jobs; and
- identifying a subset of print jobs from the plurality of print jobs such that a ratio of a subset print job size to the total print job size equals a cell capacity ratio associated with the configuration,
- wherein the subset print job size comprises a sum of the print job sizes associated with the print jobs in the subset,
- wherein the cell capacity ratio comprises a ratio of a sum of processing speeds of each print device in the cell to a sum of processing speeds of each print device in the print shop.

14. The system of claim 13, wherein the one or more programming instructions comprise one or more programming instructions for:
- generating an ordered list comprising the plurality of print jobs arranged in descending order by corresponding print job size;
- identifying a number of print jobs in the identified subset of print jobs;
- determining an index value by incrementing the identified number of print jobs; and
- identifying the print job size associated with the print job at a position in the ordered list equal to the index value.

15. The system of claim 13, wherein the one or more programming instructions comprise one or more programming instructions for:
- determining a cell capacity ratio by determining a ratio of a sum of processing rates associated with the print devices in the configuration to a sum of processing rates associated with the plurality of available print devices.

16. The system of claim 13, wherein the one or more programming instructions comprise one or more programming instructions for:
- identifying a plurality of bottleneck print devices from the plurality of print devices, wherein each identified bottleneck print device performs a bottleneck function; and
- determining a cell capacity ratio by determining a ratio of a sum of processing rates associated with each bottleneck print device in the configuration to a sum of processing rates associated with the identified plurality of bottleneck print devices.

17. The system of claim 12, wherein the one or more programming instructions for determining a job size threshold value comprise one or more programming instructions for:
- identifying a plurality of bottleneck print devices from the plurality of print devices, wherein each identified bottleneck print device performs a bottleneck function;
- determining a cell capacity ratio by determining a ratio of a sum of processing rates associated with each bottleneck print device in the configuration to a sum of processing rates associated with the identified plurality of bottleneck print devices; and
- determining a job size threshold value that is proportional to the cell capacity ratio.

18. The system of claim 12, wherein the one or more programming instructions for determining a processing time comprises one or more programming instructions for determining a turnaround time associated with processing the plurality of print jobs by a cell having the configuration and the determined job size threshold value.

19. The system of claim 12, wherein the one or more programming instructions for determining a processing time comprise one or more programming instructions for determining a makespan value associated with processing the plurality of print jobs by a cell having the configuration and the determined job size threshold value.

20. The system of claim 12, wherein the one or more programming instructions comprise one or more programming instructions for:
- processing, by the selected cell, one or more print jobs from the plurality of print jobs, wherein each of the one or more print jobs has a print job size that is less than the associated print job size threshold value.

21. The system of claim 12, wherein the one or more programming instructions comprise one or more programming instructions for:
- identifying a second plurality of print jobs, wherein the second plurality of print jobs are to be processed by the print shop at a future time;
- identifying a second print job size distribution associated with the second plurality of print jobs;
- determining an updated print job size threshold value associated with processing the second plurality of print jobs by the selected cell; and
- processing, by the selected cell, one or more print jobs from the second plurality of print jobs, wherein each of the one or more print jobs has a print job size that is less than the associated print job size threshold value.

* * * * *